United States Patent
Carlson et al.

(10) Patent No.: US 9,249,883 B2
(45) Date of Patent: Feb. 2, 2016

(54) ANTI-ROTATE ATTENUATION DEVICE

(71) Applicant: GM Global Technology Operations LLC, Detroit, MI (US)

(72) Inventors: Eric Thomas Carlson, Linden, MI (US); Jack M. Gayney, Grosse Ile, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 473 days.

(21) Appl. No.: 13/743,725

(22) Filed: Jan. 17, 2013

(65) Prior Publication Data

US 2014/0196602 A1  Jul. 17, 2014

(51) Int. Cl.
*F16J 1/00* (2006.01)
*F16H 63/00* (2006.01)

(52) U.S. Cl.
CPC .. *F16J 1/00* (2013.01); *F16H 63/00* (2013.01)

(58) Field of Classification Search
CPC ......... F15B 15/1471; F16J 1/00; F16H 63/00; F16D 25/00; F16D 25/08
See application file for complete search history.

(56) References Cited

U.S. PATENT DOCUMENTS

| | | | | |
|---|---|---|---|---|
| 3,815,715 A * | 6/1974 | Maucher | ......................... | 192/98 |
| 4,144,957 A * | 3/1979 | de Gennes | ...................... | 192/98 |
| 4,186,828 A * | 2/1980 | Renaud | ........................... | 192/98 |
| 4,529,075 A * | 7/1985 | Renaud | ........................... | 192/98 |
| 4,702,361 A * | 10/1987 | Banks | ............................ | 192/98 |
| 4,815,867 A * | 3/1989 | Ladin | ........................... | 384/617 |
| 5,370,401 A * | 12/1994 | Sandgren | ...................... | 277/306 |
| 5,598,912 A * | 2/1997 | Uenohara | .................. | 192/85.52 |
| 5,794,752 A * | 8/1998 | Baer et al. | ................. | 192/85.52 |
| 2011/0073428 A1* | 3/2011 | Aberg | ...................... | 192/48.616 |

FOREIGN PATENT DOCUMENTS

FR         2741401 A1 *  5/1997  .............. F15B 15/28
WO    WO 2011042004 A3 *  1/2012  .......... F16D 2300/18

OTHER PUBLICATIONS

File Name: FR2741401_MachineTranslate.pdf. Inventor: Phelps et al.; Title: Hydraulic Clutch Control Cylinder; Document pertaining to machine translation of French Application: FR2741401(A1), hydraulic clutch control cylinder; pp. 1-13.*

* cited by examiner

*Primary Examiner* — Edward Look
*Assistant Examiner* — Daniel Collins

(57) ABSTRACT

A piston assembly, which may be part of a concentric slave cylinder for use in an automatic transmission, is provided. The piston assembly includes a piston and a piston cylinder disposed adjacent to the piston and having portions forming a receiving slot. A piston guide is attached to the piston. The piston guide has a main body portion and an alignment protrusion extending from the main body portion. The alignment protrusion is disposed in the receiving slot of the piston cylinder. The alignment protrusion includes a main alignment portion and a spring lever. The spring lever is separated from the main alignment portion by a gap. Compressible material is disposed in the gap.

18 Claims, 2 Drawing Sheets

ANTI-ROTATE ATTENUATION DEVICE

FIELD

The present disclosure relates to a piston guide device and assembly, and more particularly, to an assembly including a piston guide for guiding the travel of a piston within an automotive transmission.

BACKGROUND

The statements in this section merely provide background information related to the present disclosure and may or may not constitute prior art.

In many modern automotive transmissions, especially dual clutch transmissions (DCT's), a plurality of hydraulic actuators (operators) carry out commands that provide both a desired shift and shift sequence. In order to control such operators and confirm the attainment of a desired position, it is common practice to employ plural state or proportional linear position sensors that, in the former case, provide, for example, a signal that changes from a first state to a second state when a particular operator position has been achieved and, in the latter case, provide a signal that varies linearly (proportionally) between a first actuator position and a second actuator position. The proportional sensors generate data that indicates when multiple distinct actuator positions have been achieved and provide the real time position of the actuator during translation and, if differentiated, the speed of the actuator.

In a typical magnetic field linear sensor assembly, a permanent magnet is mounted to a translating component such as the actuator piston, the output shaft or an associated shift rail and the magnetic sensor, which is stationary, is secured in proximate, sensing relationship with the permanent magnet to a housing, flange, web or other stationary transmission component. Translation of the permanent magnet thus varies the magnetic field strength sensed by the sensor and, with proper conditioning, scaling and software, the position of the actuator and associated shift components can be determined.

A concentric slave cylinder assembly having concentric piston rings is often used to actuate two clutches that are located near each other, such as in a DCT that have two input shafts, wherein each input shaft provides a subset of the available gear ratios. Each input shaft is selectively coupled to an engine by the use of one of these clutches. The pistons are designed to travel linearly. The linear travel of each piston is sensed by a sensor assembly, as described above, to measure the stroke of each piston. However, any non-linear movement is also sensed by such sensors and may be result in an inaccurate measurement of the piston position. When the piston position is inaccurately measured, clutch apply pressure is erroneously adjusted, which may result in shift flares or firm shift applies. Accordingly, more accurate measurement of piston stroke is desired.

SUMMARY

The present disclosure provides a piston assembly with improved linear travel properties. The piston guide of the present disclosure fits tightly in the cylinder housing to provide for linear piston travel and avoid non-linear piston travel. As such, a linear sensor can accurately detect the position of the piston.

In one form, which may be combined with or separate from the other forms described herein, the present disclosure provides a piston assembly for use in an automatic transmission. The piston assembly includes a piston and a piston cylinder disposed adjacent to the piston. The piston cylinder has portions forming a receiving slot. A piston guide is attached to the piston. The piston guide has a main body portion and an alignment protrusion extending from the main body portion. The alignment protrusion is disposed in the receiving slot of the piston cylinder. The alignment protrusion has a main alignment portion and a spring lever. The spring lever is separated from the main alignment portion by a gap. Compressible material is disposed in the gap.

In another form, which may be combined with or separate from the other forms described herein, a concentric slave cylinder piston assembly for use in an automatic transmission is provided. The concentric slave cylinder piston assembly includes an inner piston, an inner piston cylinder, an outer piston, an outer piston cylinder, and a piston guide attached to the inner piston. The inner piston cylinder is disposed adjacent to the inner piston and has portions forming a receiving slot. The outer piston cylinder is also disposed adjacent to the inner piston. The outer piston is disposed adjacent to the outer piston cylinder. The piston guide has a main body portion and an alignment protrusion extending from the main body portion. The alignment protrusion is disposed in the receiving slot of the inner piston cylinder. The alignment protrusion has a main alignment portion and a spring lever. The spring lever is separated from the main alignment portion by a gap. A compressible material is disposed in the gap.

In yet another form, which may be combined with or separate from the other forms described herein, a concentric slave cylinder piston assembly for use in an automatic transmission is provided. The assembly includes an annular inner piston and an annular inner piston cylinder disposed concentrically within the inner piston. The inner piston cylinder has portions forming a receiving slot. An annular outer piston cylinder is disposed adjacent to the inner piston, wherein the inner piston is disposed concentrically within the outer piston cylinder. Further, the annular outer piston is disposed adjacent to the outer piston cylinder, wherein the outer piston cylinder is disposed concentrically within the outer piston. A piston guide is provided having an annular main body portion and an arcuate alignment protrusion extending from the main body portion. The main body portion is attached to the inner piston. The alignment protrusion is disposed in the receiving slot of the inner piston cylinder. The alignment protrusion includes a main alignment portion and a spring lever. The spring lever is separated from the main alignment portion by a gap. A compressible elastomeric material is disposed in the gap.

Further aspects and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
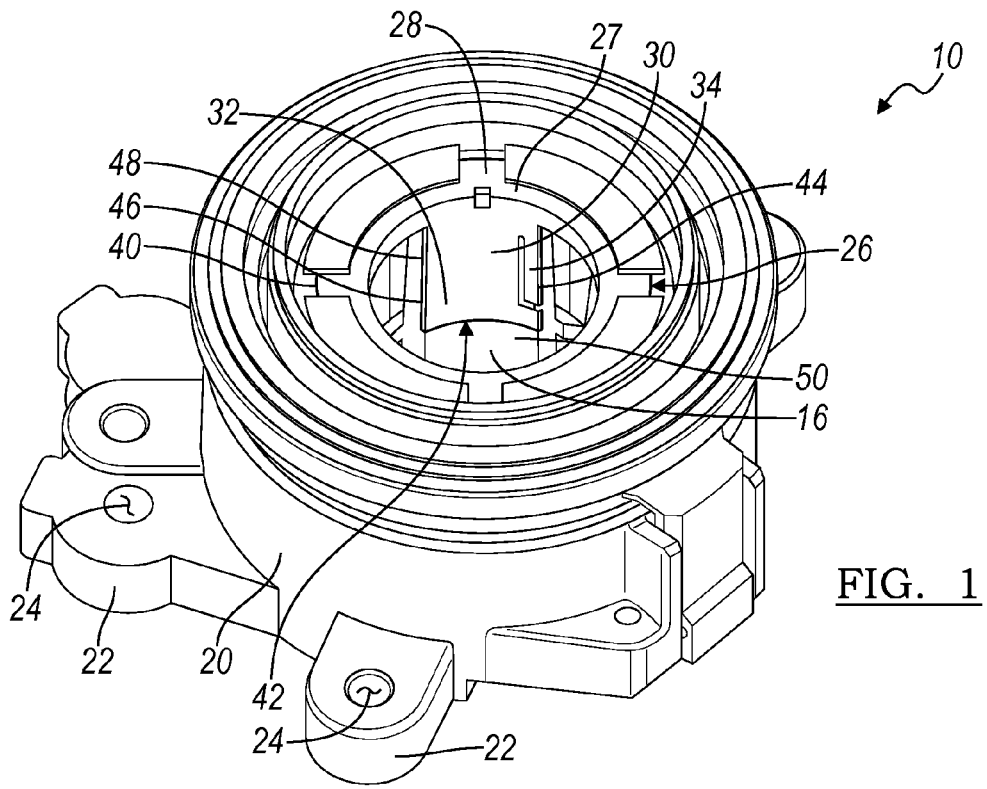
FIG. 1 is a perspective view of a concentric slave cylinder assembly for a dual clutch transmission, in accordance with the principles of the present disclosure.
Figure 2:
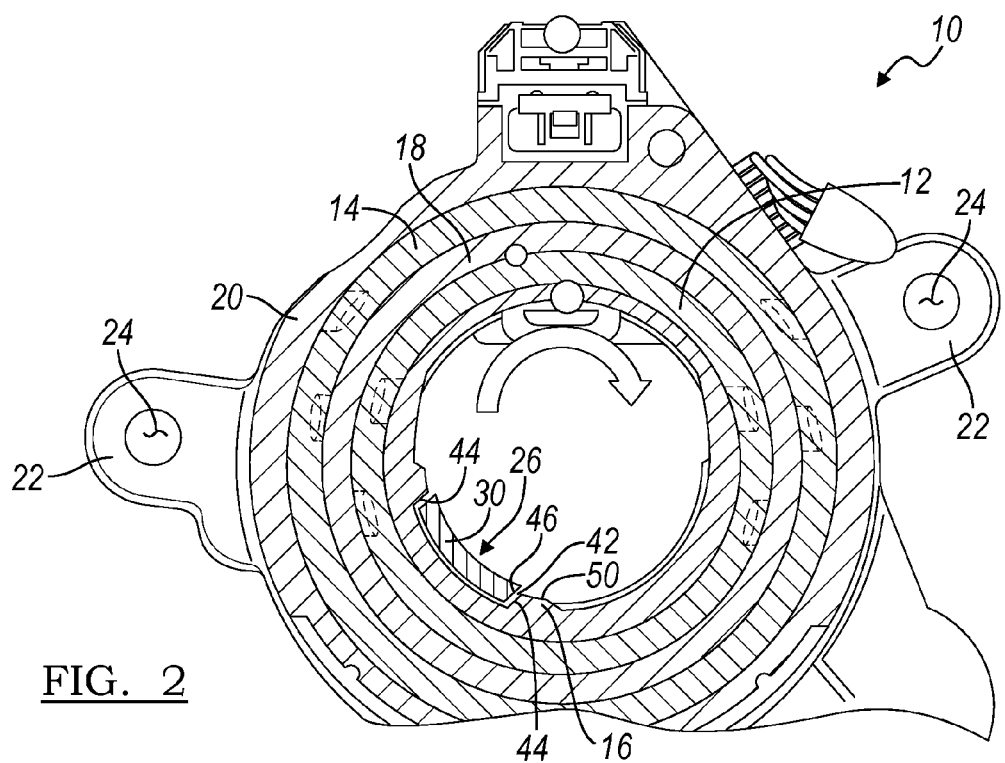
FIG. 2 is a cross-sectional plan view of the concentric slave cylinder assembly of FIG. 1, according to the principles of the present disclosure.
Figure 3:
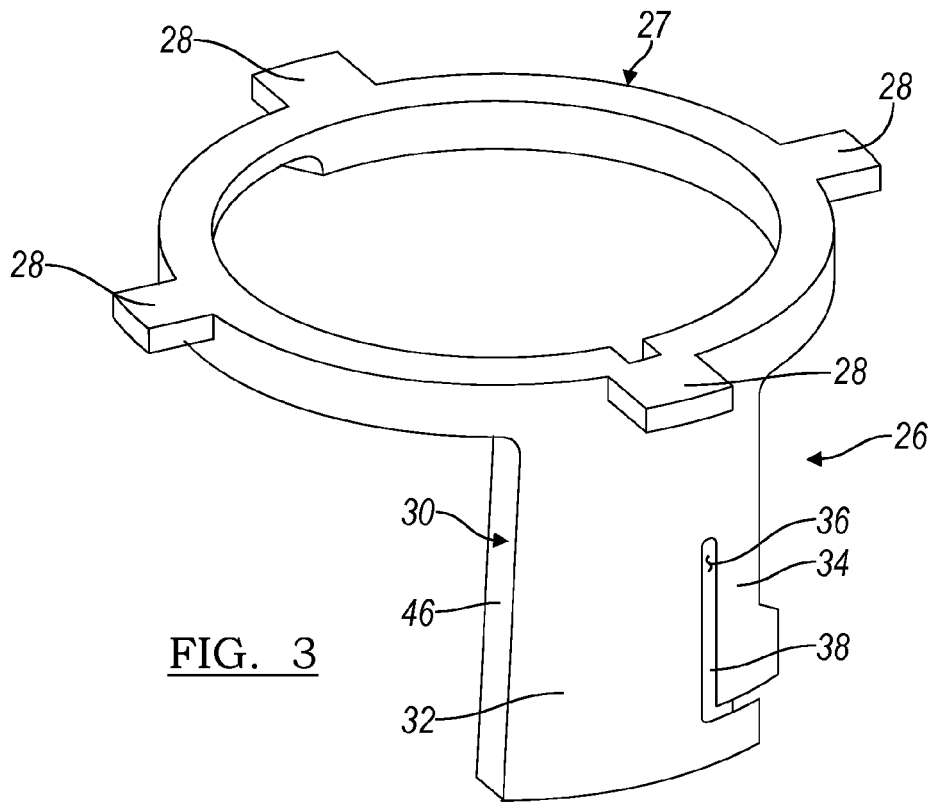
FIG. 3 is a perspective view of a piston guide of the concentric slave cylinder assembly of FIGS. 1-2, in accordance with the principles of the present disclosure.
Figure 4:
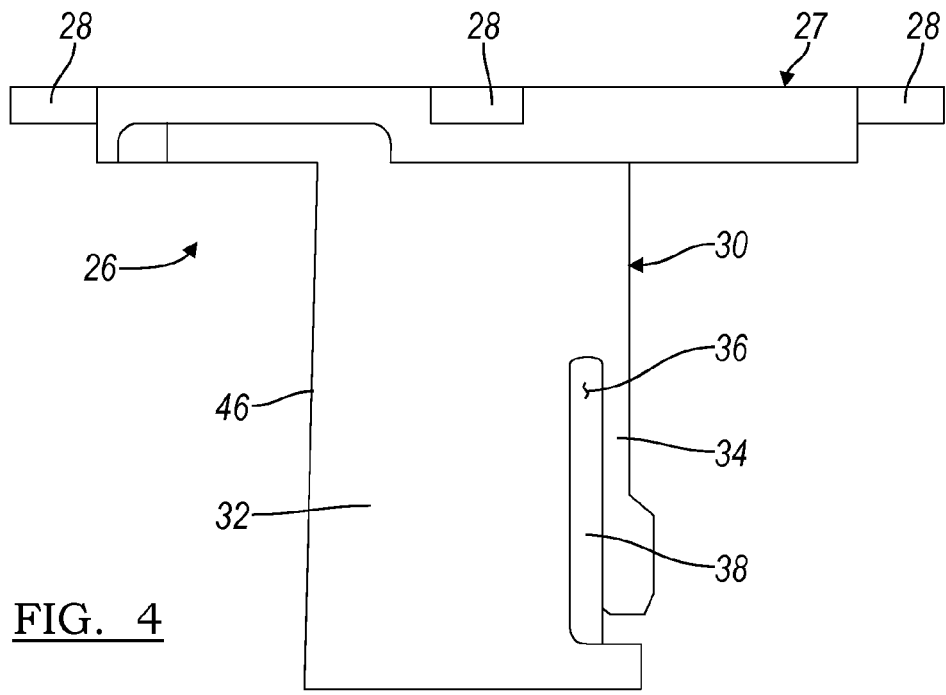
FIG. 4 is a side view of the piston guide of FIG. 3, according to the principles of the present disclosure.

With reference to FIGS. 1-2, a concentric slave cylinder assembly is illustrated and generally designated at 10. The concentric slave cylinder assembly 10 may be used to actuate two clutches that are located near each other, such as in a DCT having two input shafts (not shown) that each provide a subset of the available gear ratios. Each input shaft, e.g., is selectively coupled to an engine through use of one of these clutches.

The concentric slave cylinder assembly 10 has a pair of concentric pistons 12, 14 in the form of rings. The pistons 12, 14 are designed to travel linearly (into and out of the page in the orientation of FIG. 2). The linear travel of each piston 12, 14 is sensed by a sensor assembly, such as a magnetic field linear sensor assembly, to measure the stroke of each piston.

The concentric slave cylinder piston assembly 10 has an inner piston cylinder housing 16 disposed concentrically within the inner and outer pistons 12, 14. The inner piston 12 is disposed immediately adjacent to and concentrically around the inner piston cylinder housing 16. An outer piston cylinder housing 18 is disposed immediately adjacent to and concentrically around the inner piston 12. The outer piston 14 is disposed immediately adjacent to and concentrically around the outer piston cylinder housing 18. The inner piston 12, the outer piston 14, the inner piston cylinder housing 16, and the outer piston cylinder housing 18 are all annular in shape. An assembly housing 20 may be disposed around the concentric slave cylinder piston assembly 10, the inner piston 12, the outer piston 14, the inner piston cylinder housing 16, and the outer piston cylinder housing 18 for attaching the concentric slave cylinder assembly 10 to a transmission housing (not shown). As such, the assembly housing 20 may have projections 22 forming bores 24 therein for attaching the assembly housing 20 to the transmission housing (not shown).

Referring to FIGS. 1-4, a piston guide 26 is attached to the inner piston 12 for guiding the travel of the inner piston 12 along a linear path. The piston guide 26 has an annular main body portion 27 and an alignment protrusion 30 extending from the main body portion 27. The alignment protrusion 30 has a main alignment portion 32 and a spring lever 34. The spring lever 34 is separated from the main alignment portion 32 by a gap 36. Compressible material 38, such as elastomeric material or rubber, is disposed in the gap 36.

The piston guide 26 is attached to the inner piston 12. The piston guide 26 may be attached to the inner piston 12 in any suitable manner, such as by splines, staking, or any combination of methods or apparatuses. For example, in the illustrated variation, the piston guide 26 has four tabs 28, each spaced equally around the circumference of the main body portion 27 of the piston guide 26. The tabs 28 are splined to an edge 40 of the inner piston 12.

The main body portion 27 and the alignment protrusion 30 of the piston guide 26 may comprise a polyamide-imide material or any other suitable material.

The alignment protrusion 30 of the piston guide 26 is disposed in a receiving slot 42 of the inner piston cylinder housing 16. The receiving slot 42 is formed as a pocket in the inner piston cylinder housing 16, in the illustrated variation. The alignment protrusion 30 has a generally arcuate shape that fits into the receiving slot 42 of the inner piston cylinder housing 16. In some variations, the alignment protrusion 30 may lie flush or substantially flush with the inner side 50 of the piston cylinder housing 16 that is disposed around the receiving slot 42.

The alignment protrusion 30 guides the inner piston 12 along the inner piston cylinder housing 16 as the inner piston 12 strokes along the inner piston cylinder housing 16. The spring lever 34 fits tightly along an edge 44 of the receiving slot 42, and an edge 46 of the main alignment portion 32 fits tightly along an opposite edge 48 of the receiving slot 42. (In the illustration of FIG. 2, the edges 44, 48 of the receiving slot 42 and the alignment protrusion 30 are shown with space, or a gap, between them for clarity in viewing the edges 44, 48, 46, 48 of each part, but it should be understood that the alignment protrusion 30 fits snugly against the edges 44, 48 of the receiving slot 42. The compressible material 38 exerts a force on portions of the alignment protrusion 30 to push the spring lever 34 and the opposite edge 46 of the alignment protrusion 30 against the edges 44, 48 of the receiving slot 42 in the inner piston cylinder housing 16.

Because the alignment protrusion 30 fits snugly against the edges 44, 48 of the receiving slot 42 of the inner piston cylinder housing 16, the alignment protrusion 30 guides the attached inner piston 12 along a linear path with respect to the inner piston cylinder housing 16. Accordingly, the piston guide reduces or eliminates any errors in the measurement of the linear piston stroke of the inner piston 12, because the piston guide 26 prevents the inner piston 12 from moving in a non-linear direction with respect to the inner piston cylinder housing 16.

The description of the invention is merely exemplary in nature and variations that do not depart from the gist of the invention are intended to be within the scope of the invention. Such variations are not to be regarded as a departure from the spirit and scope of the invention.

What is claimed is:

1. A piston assembly for use in an automatic transmission, the piston assembly comprising:
   a annular piston;
   an annular piston cylinder disposed concentrically within the piston and having portions forming a receiving slot on an inner facing side of the piston cylinder; and
   a piston guide having a main body portion and an alignment protrusion extending from the main body portion, the piston guide being attached to the piston, the alignment protrusion being slidably disposed in the receiving slot of the piston cylinder with the piston guide separated from the piston by a wall of the piston cylinder, the alignment protrusion comprising a main alignment portion and a spring lever, the spring lever being separated from the main alignment portion by a gap, the piston guide having a compressible material disposed in the gap.

2. The piston assembly of claim 1, wherein the compressible material is an elastomeric material, the compressible material exerting a force on the alignment protrusion acting to push the spring lever against an edge of the receiving slot.

3. The piston assembly of claim 2, wherein the main body portion of the piston guide is attached to the piston.

4. The piston assembly of claim 3, wherein the main body portion of the piston guide has a generally annular shape.

5. The piston assembly of claim 4, wherein the alignment protrusion has an arcuate shape.

6. The piston assembly of claim 5, wherein the piston guide comprises a polyamide-imide material.

7. The piston assembly of claim 6, wherein piston guide further comprises a tab extending from the main body portion, the tab being attached to the piston.

8. The piston assembly of claim 7, wherein the tab is splined to the piston.

9. A concentric slave cylinder piston assembly for use in an automatic transmission, the assembly comprising:
    an annular inner piston;
    an annular inner piston cylinder disposed concentrically within the inner piston such that the piston is axially displaceable in the piston cylinder, and having portions forming a receiving slot on an inner facing side of the piston cylinder;
    an outer piston cylinder disposed adjacent to the inner piston;
    an outer piston disposed adjacent to the outer piston cylinder; and
    a piston guide having a main body portion and an alignment protrusion extending from the main body portion, the piston guide being attached to the inner piston, the alignment protrusion being slidably disposed in the receiving slot of the inner piston cylinder with the piston guide separated from the piston by a wall of the piston cylinder, the alignment protrusion comprising a main alignment portion and a spring lever, the spring lever being separated from the main alignment portion by a gap, the piston guide having a compressible material disposed in the gap.

10. The assembly of claim 9, wherein the compressible material is an elastomeric material, the compressible material exerting a force on the alignment protrusion acting to push the spring lever against an edge of the receiving slot.

11. The assembly of claim 10, wherein the main body portion of the piston guide is attached to the inner piston.

12. The assembly of claim 11, wherein the main body portion of the piston guide has a generally annular shape.

13. The assembly of claim 12, wherein the alignment protrusion has an arcuate shape.

14. The assembly of claim 13, wherein the outer piston and the outer piston cylinder is annular in shape.

15. The assembly of claim 14, wherein the inner piston is concentrically disposed within the outer piston cylinder, and the outer piston cylinder is concentrically disposed within the outer piston.

16. The assembly of claim 15, wherein the piston guide comprises a polyamide-imide material.

17. The assembly of claim 16, wherein piston guide further comprises a tab extending from the main body portion, the tab being splined to the inner piston.

18. A concentric slave cylinder piston assembly for use in an automatic transmission, the assembly comprising:
    an annular inner piston;
    an annular inner piston cylinder disposed concentrically within the inner piston, the inner piston cylinder having portions forming a receiving slot;
    an annular outer piston cylinder disposed adjacent to the inner piston, wherein the inner piston is disposed concentrically within the outer piston cylinder;
    an annular outer piston disposed adjacent to the outer piston cylinder, wherein the outer piston cylinder is disposed concentrically within the outer piston; and
    a piston guide having an annular main body portion and an arcuate alignment protrusion extending from the main body portion, the main body portion being attached to the inner piston, the alignment protrusion being disposed in the receiving slot of the inner piston cylinder, the alignment protrusion comprising a main alignment portion and a spring lever, the spring lever being separated from the main alignment portion by a gap, the piston guide having a compressible elastomeric material disposed in the gap, the compressible material exerting a force on the alignment protrusion acting to push the spring lever against an edge of the receiving slot.

\* \* \* \* \*